UNITED STATES PATENT OFFICE.

HORACE W. LASH, OF SAN FRANCISCO, CALIFORNIA.

METHOD FOR REDUCING IRON OXIDS.

1,296,973. Specification of Letters Patent. Patented Mar. 11, 1919.

No Drawing. Application filed September 4, 1917. Serial No. 189,477.

*To all whom it may concern:*

Be it known that I, HORACE W. LASH, a citizen of the United States, residing at San Francisco, in the county of San Francisco and State of California, have invented a certain new and useful Improvement in Methods for Reducing Iron Oxids, of which the following is a full, clear, and exact description.

This invention provides a method by which iron ore may be reduced to form pig iron or steel in an open hearth or similar furnace, and in addition, and forming a part of the furnace charge, scrap ferrous material may be employed.

By the method proposed the iron ore, together with suitable reducing agents, are associated with each other and confined in such a manner that they may readily react under proper conditions to effect the desired results.

Furthermore, the method provides reducing conditions for the reduction of iron ore, although the general conditions in the furnace may be oxidizing.

In carrying out my process, I prepare an intimate mixture of iron ore, together with a suitable form of carbonaceous material, such as coke, coal, charcoal, etc., both being in finely divided condition.

I have obtained good results by using a mixture of iron and coke in finely divided form and in the proportion of 70% iron oxid and 30% coke. This mixture is confined within and enveloped by scrap ferrous material, which is compressed into bundle form, the iron ore and coke being placed approximately in the central portion of the bundle. The scrap material forms about 40% of the whole bundle, and the entire bundle with the ore and carbon together will weigh between 200 and 300 pounds.

Such bundles are charged into an open hearth or similar furnace, and heated in the usual manner. As the bundles become heated, they are heated from the outside toward the interior of the bundles, and as the heating progresses the scrap material melts and the material within the bundle are in a very advantageous position to react with each other, the carbon reducing the iron oxid to metallic iron, a certain portion of the carbon uniting with the metallic iron formed from the oxid and the scrap iron, to form pig iron or steel.

A suitable fluxing material may be used.

It will be seen that although the conditions in the furnace generally may be oxidizing, the conditions within the bundle of scrap material during the heating and melting operation are reducing, for the carbon present creates and maintains such a condition.

It will furthermore be apparent that the bundle of scrap protects the carbon against undue oxidation, so that the carbon is substantially in its entirety available as a reducing agent, and further available to react and combine with the iron newly reduced and the scrap material.

I have found it advantageous to intimately mix with the iron oxid and carbonaceous material before placing the same in the bundle of scrap material, a small proportion of finely divided cast iron such as cast iron borings, turnings, chips, or similar material. The cast iron material contains metalloids which aid in the reducing of the iron oxid during the heating and melting operation.

It will be apparent that bundles of scrap material containing iron oxid and carbonaceous material in finely divided condition may be utilized as a part of an open hearth furnace charge.

It is usual open hearth practice to use cast iron as the source of ferrous material for the production of steel with or without the use of additional scrap material and carbon. The bundles of scrap with their included materials may be charged into an open hearth furnace along with pig iron and treated in the same manner as the usual open hearth furnace charge.

Having described my invention, I claim:

1. The method of reducing iron oxids which consists in providing a mixture of iron oxid and carbonaceous material in finely divided condition and thoroughly mixed, within a bundle of scrap ferrous material and in heating the said bundle.

2. The method of reducing iron oxids which consists in providing a mixture of iron oxid, carbonaceous material and cast iron, all in finely divided condition and thoroughly mixed, and in enveloping said mixture within a bundle of fusible ferrous scrap material and heating the same to a sufficiently high temperature to produce the desired reaction.

3. A furnace charge unit which consists of a compressed bundle of ferrous scrap material within which is contained a finely divided, thorough mixture of iron oxid and carbonaceous material.

In testimony whereof, I hereunto affix my signature.

HORACE W. LASH.

Copies of this patent may be obtained for five cents each, by addressing the "Commissioner of Patents, Washington, D. C."